United States Patent [19]

Seidel

[11] Patent Number: 4,704,671
[45] Date of Patent: Nov. 3, 1987

[54] SWITCHING TYPE VOLTAGE REGULATOR WITH NONCONTINUOUS FEEDBACK

[75] Inventor: Harold Seidel, Warren, N.J.

[73] Assignee: American Telephone and Telegraph Company, AT&T Bell Laboratories, Murray Hill, N.J.

[21] Appl. No.: 902,812

[22] Filed: Sep. 2, 1986

[51] Int. Cl.⁴ .......................................... H02H 7/122
[52] U.S. Cl. ........................................ 363/56; 363/97
[58] Field of Search ............... 363/56, 97, 98, 133, 363/134

[56] References Cited

U.S. PATENT DOCUMENTS

| | | | |
|---|---|---|---|
| 3,145,334 | 8/1964 | Berman | 321/2 |
| 3,426,266 | 2/1969 | Day et al. | 323/22 |
| 3,679,962 | 7/1972 | Waniass | 363/98 |
| 3,873,903 | 3/1975 | Koetsch et al. | 321/2 |
| 4,048,552 | 9/1977 | Stone | 363/25 |
| 4,326,244 | 4/1982 | Josephson | 363/56 |
| 4,519,023 | 5/1985 | Lester | 363/56 |
| 4,623,960 | 11/1986 | Eng | 363/56 X |

Primary Examiner—Peter S. Wong
Assistant Examiner—Kristine Peckman
Attorney, Agent, or Firm—Alfred G. Steinmetz

[57] ABSTRACT

A voltage regulator circuit for a switching type converter operates by applying full power to the output if it falls below a reference value and zero power if the reference value is exceeded. The switching device of the voltage regulator is operated at a first high frequency and is periodically enabled to supply power to the output for discrete operative clock cycles at a second lower clock frequency in accord with the output signal level. An interval of off-time follows each operative cycle.

In another embodiment operation of the switching devices is continuous, but power flow to the output is significantly reduced when the output voltage is overlimit.

10 Claims, 4 Drawing Figures

SWITCHING TYPE VOLTAGE REGULATOR WITH NONCONTINUOUS FEEDBACK

FIELD OF THE INVENTION

This invention is concerned with switching type voltage regulators and more particularly to an asynchronous or noncontinuous feedback arrangement to regulate an output voltage.

BACKGROUND OF THE INVENTION

Switching type voltage regulators operate by sequentially driving a power switching transistor from a fully nonconducting state to a fully conducting state and back to a fully nonconducting state. The respective durations of the conducting and nonconducting states are responsive to a comparison of the output voltage with a reference voltage. The switch drive may be periodic, in which circumstance the sum of successive on and off times is a fixed time interval or period and the fixed frequency of operation is supplied by a fixed frequency drive source. Other arrangements utilize a variable time interval with a fixed on-time or fixed off-time, whereby a ratio of off-time or on-time to the period or duty cycle is varied by varying a frequency of operation of the regulator. In these arrangements, the feedback of the voltage regulator control is continuous. It is usually embodied as an analog feedback system in which an error signal is generated that is effective to control a duty cycle of a power switch only at the beginning of each switching cycle. Hence, the speed of response to changes at the output is limited by the duration of the period. In yet a third variation, the on/off times, duty cycle and frequency are all allowed to freely vary with the power switch's conductivity transitions being immediately responsive to an attainment of upper and lower threshold values of an output voltage of the regulator. Such a free running type of voltage regulator generally operates very well requiring only a low level of circuit complexity in the feedback voltage control circuitry. It has the further advantage of a faster speed of response as compared with conventional continuous feedback arrangements. The disadvantage of this arrangement is that the discontinuous feedback may respond to nonequilibrium conditions or signals existing in the circuit and thus set up a condition which prevents the circuit from stabilizing. For example, when the power switch is initially gated on, the power supply may go through several inefficient transient cycles until a steady state condition is reached. In another case, the turnoff interval may be too short and internal transients are generated which impose transients on the system at a subsequent turn-on of the power switch.

SUMMARY OF THE INVENTION

A voltage regulation circuit for a switching type converter operates by applying full power to the output if it falls below a reference value and at a zero, or at a significantly reduced power if the reference value is exceeded. In one particular embodiment of the invention, the switching device of the voltage regulator is operated at a first high frequency and is periodically enabled to supply power to the output for discrete operative clock cycles at a second lower clock frequency in accord with the output signal level. A definite interval of off-time follows each operative cycle. If the output falls below a regulated value, the switching regulator is enabled to operate for one or more clock cycles as defined by the second clock frequency and supply power to the output at its first switching frequency. When the output is at or above regulated value, the switching regulator is disabled during a subsequent clock cycle as defined by the second clock frequency. The second clock cycle period is selected so that the off, or disable, cycle is sufficient to allow signal transients to decay before a subsequent on, or enable, cycle is initiated and the on, or enable, cycle similarly has a minimum duration time period to prevent unwanted oscillations.

In another embodiment of the invention a power stage with a continuously operating power switch operating at a high frequency is coupled to a load through a tuned network. A feedback arrangement monitors the load voltage and if the voltage rises above an upper limit, the tuned circuit is purposely detuned to block power flow to the load for a fixed delay interval. This arrangement advantageously permits application of the principles of the invention to a self-oscillating power stage.

In yet another embodiment of the invention, a power stage is operated at a first frequency at which it produces its maximum power output as long as the output voltage is below a threshold level. If that threshold level is exceeded, the frequency of operation of the power stage is shifted to a different operation frequency for at least a minimum fixed interval in order to significantly reduce power output of the power stage for the duration of that interval.

BRIEF DESCRIPTION OF THE DRAWING

An understanding of the invention may be readily attained by reference to the following specification and its accompanying drawing wherein.

DETAILED DESCRIPTION

Figure 1:
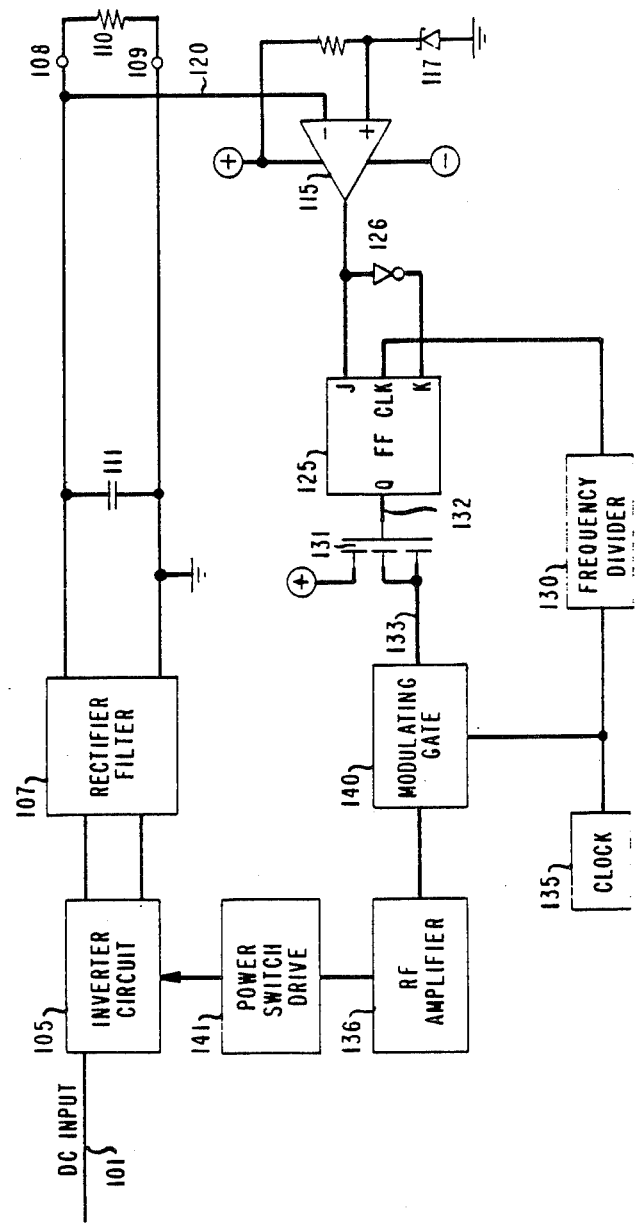
FIG. 1 is a schematic of a power supply embodying the principles of the invention.

A switching type power supply with noncontinuous feedback regulation is disclosed in FIG. 1. A DC voltage is applied to an input terminal 101 of an inverter circuit 105. Inverter circuit 105 may be single ended or double ended. Its AC output is applied to a rectifier-filter circuit 107 and from thence a DC output voltage is supplied at output terminals 108 and 109 and is coupled to a load 110. A voltage stabilizing capacitor 111 shunts the output terminals 108 and 109 and is operative to stabilize and counteract voltage excursions at the output terminals.

The output voltage is sensed and coupled via lead 120 to an inverting input of a comparator circuit 115. A bias voltage is coupled to a breakdown diode 117 to generate a reference voltage which is applied to the noninverting input of comparator circuit 115. The output at the comparator 115 is coupled to the J input of a J-K flip flop 125 and to a polarity inverter 126 whose output is in turn connected to the K input of J-K flip flop 125. J-K flip flops are bistable circuits which are well known to those skilled in the art and can be operated in many different modes. It is operated in a J-K mode here in which the J-K inputs are always of opposite polarity and simultaneously enabled. The clock input to J-K flip flop 125 is supplied by a frequency divider 130 which counts down an output of a clock 135. The Q output is switched in synchronism with the divided clock pulses and has a polarity responsive to the current state of the J-K inputs.

The Q output of flip flop 125 is coupled to a gate lead 132 of a FET 131 whose drain terminal 133 is coupled to an enable input of a modulation gate 140. The modulation gate 140 couples the output of clock 135 to an RF amplifier 136 and from thence to the power switch drive 141 which in turn drives the power switching devices or the inverter circuit 105 to obtain the desired inverting action.

Figure 2:
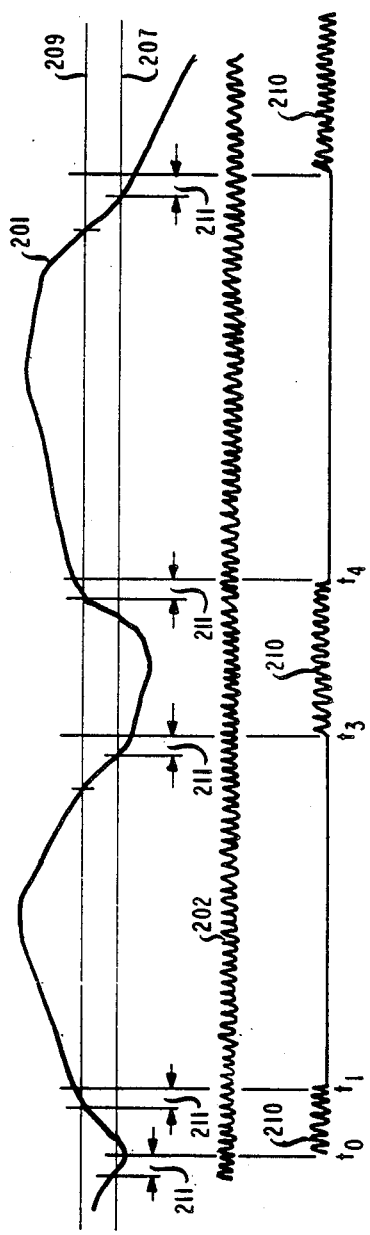
FIG. 2 discloses waveforms utilized in describing the operation of the circuit shown in FIG. 1.

The signal or pulse output of clock 135 is at a very high frequency preferably in the megahertz range and is shown by the waveform 202 in FIG. 2. This high frequency signal is coupled to the power switch driver 141 via gate 140 and amplifier 136 and drives the power switching devices in the inverter circuit at a megahertz switching rate. Transmission through the modulation gate 140 of this high frequency pulse signal generated by clock 135, shown by waveform 210 as shown in FIG. 2, is responsive to the Q output of J-K flip flop 125. This output is dependent upon the output voltage level as compared with the reference voltage of breakdown diode 117. This may be readily ascertained by reference to the waveforms of FIG. 2, wherein waveform 201 shows in an exaggerated form voltage excursions of the output voltage across output terminals 108 and 109. As long as this voltage is below an upper threshold limit 209, the output of the J-K flip flop as clocked by the output or frequency divider 130 enables the modulating gate 140 to couple a group of driving pulses 210 from $T_0$ to $T_1$ to drive the switching devices of the inverter. When the output voltage exceeds the upper threshold value 209 at $T_1$, the modulation gate 140 is disabled since the output voltage as compared with the reference voltage has now caused the comparator circuit output to change state and in turn change the Q output state of J-K flip flop 125. Hence, no drive pulses are applied to the power switch drive 141 until the output voltage drops to the threshold voltage 207 at $T_3$ whereas the comparator output changes state again enabling the modulation gate 140 through the J-K flip flop to couple clock drive pulses 210 to the power switch drive 141 until the upper threshold value 209 is reached at time $T_4$, whereupon the gate is again disabled. The two threshold levels 207 and 209 are due to the hysteretic characteristic of the comparator 115. As shown in FIG. 2 there is a finite time delay 211 between the time that the output voltage waveform 201 crosses one of the threshold values 209 or 207 and the resultant action of the J-K flip flop 125 in enabling gating of the high frequency pulse waveform 202.

State changes at the output of the J-K flip flop are not necessarily coincident with intersections of the output voltage waveform and the threshold levels, but are delayed until the next pulse output of frequency divider 130, which drives the clock input at the J-K flip flop 125. This controlled delay, shown by the indicated time delays 211 in FIG. 2, following output waveform intersections with a threshold assures that upon a transition to any one state, that state will continue for at least a minumum predetermined and controlled finite duration. This permits transient signals generated by the regulator switching to substantially subside, eliminating many of the undesirable characteristics of conventional non-continuous feedback.

Hence, in a power supply such as described above, the inverter 105 is fully enabled during successive pulse cycle outputs of the frequency divider 130 when the voltage output is below a first threshold and disabled when it is above a second and higher threshold. Transitions between enabling and disabling of the inventor's power switch are keyed to the pulse output of frequency divider 130, thereby introducing controlled delays in the transition process to allow transients produced by the switching to die. This may cause the output voltage to be quantized to some extent; however, the voltage stabilizing effect capacitor 111 will generally keep this below normal ripple requirements.

Figure 3:
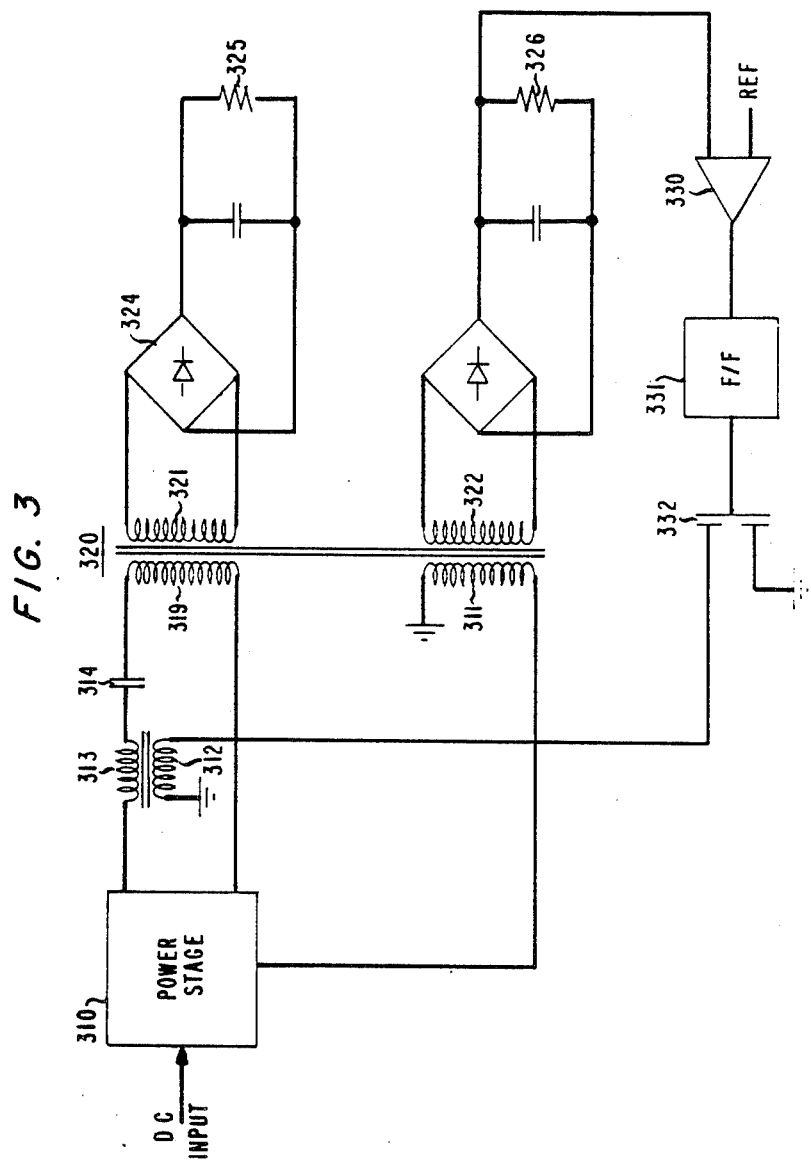
FIG. 3 is a schematic of another power supply embodying the principles of the invention.

The power supply disclosed in FIG. 3 includes a power stage 310 which comprises a power inverter including a power switching arrangement and circuitry responsive to a feedback signal supplied from power transformer winding 311 to drive the power switches in a self-oscillating mode at a first frequency. Power output from the power stage is coupled through a series tuned LC network comprising an inductor 313 and a capacitor 314, to a primary winding 319 of a power transformer 320. The inductor 313 includes a control winding 312 magnetically coupled to its inductor winding.

Output power is derived from a secondary winding 321 coupled through a rectifier 324 to a load 325. A control voltage for regulation purposes is derived from the transformer winding 322, rectified and sensed across resistor 326. This sensed voltage is compared with a reference voltage by comparator 330 whose output triggers a multivibrator 331. Hence, when the output voltage is over limit, the comparators trigger the multivibrator 331 which in turn turns on the FET switch 332 for a fixed time interval. FET switch 332, when conducting, grounds the control winding 312, detuning the LC tuned circuit and significantly reducing power flow to the output of the power supply.

Figure 4:
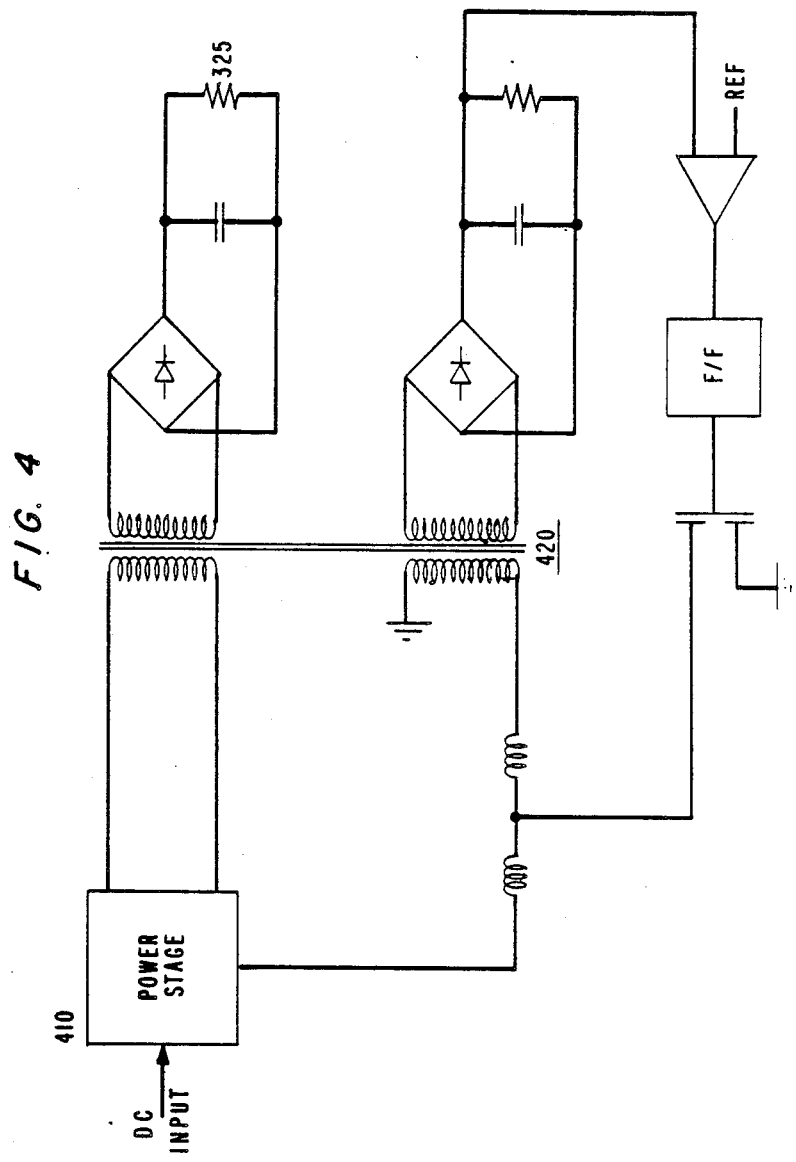
FIG. 4 is a schematic of yet another power supply embodying the principles of the invention.

A self-oscillating power supply shown in FIG. 4 includes a power stage 410 coupled through a power transformer 420 and a rectifier to a load 425. The power stage is designed so that its power output is optimal at some preselected frequency and decreases when that frequency of operation is changed. An output voltage is sensed at resistor 426 and compared with a reference voltage by comparator 430. When that voltage is overlimit, multivibrator 431 is triggered and in turn enables FET switch to ground a junction of two inductors 440 and 441 in the oscillating feedback loop, which alters the frequency of operation of the power stage 410 and significantly reduces the power output to the load.

While a control system using bistable logic has been disclosed, it is readily apparent to those skilled in the art that the invention may be embodied in many different arrangements. These other arrangements embodying the principles of the invention will suggest themselves to those skilled in the art.

What is claimed is:
1. A switching type power supply, comprising:
an input and an output,
a power switching inverter for interconnecting energy from the input to the output,
means for comparing a voltage at the output to a reference voltage and generating a control signal state representative of a relative magnitude of the voltage at the output and the reference voltage, means for operating the power switching inverter at a controlled frequency, means for periodically enabling the means for operating at a second frequency substantially lower than the controlled frequency, means responsive to the control signal state for disabling the means for periodically enabling in order to interrupt power flow to the output for at least a predetermined fixed time delay when a voltage at the output is over a limit.

2. A switching type power supply, comprising:

an input and an output, a power switching inverter for interconnecting energy from the input to the output, means for comparing a voltage at the output to a reference voltage and generating a control signal state representative of relative magnitude of the voltage at the output and the reference voltage, means for driving the power switching inverter at a predetermined frequency, and means for enabling the means for driving at a second frequency lower in frequency than the predetermined frequency and in response to the control signal state whereby the power switching inverter operates to supply power to the output at the predetermined frequency when the voltage at the output is below a first desired level and power output of the power switching inverter is blocked when the voltage at the output is above a second desired level.

3. A switching type power supply, comprising:

input means for accepting a voltage, output means for coupling to a load, power switching circuitry for coupling the input and output means, control means for operating the power switching circuitry including:

a first frequency source, a drive circuit responsive to the first frequency source for driving the power switching circuitry into operation at a first frequency, a second frequency source, means for monitoring an output voltage at the output means and enabling and disabling the application of the first frequency source to drive the power switching circuitry in response to an attainment of a predetermined amplitude of the output voltage and in synchronism and in response to the second frequency source.

4. A switching type power supply as defined in claim 3 wherein the means for monitoring an output voltage at the output means and enabling and disabling comprises, a comparator coupled to compare a voltage at the output means with a reference voltage, a bistable circuit responsive to the second frequency source and to the comparator, a gate coupling the first frequency source to the drive circuit to couple signals at the first frequency to drive the switching device, the gate being enabled and disabled in response to an output of the disabled circuit.

5. A switching type power supply comprising:

an inverter circuit including input means for accepting a DC signal and an operative for switching the DC signal;

output means including a rectifier and filter and operative for coupling an output of the inverter to a load, a drive circuit for driving the inverter circuit, a comparator coupled to compare a voltage at the output means with a reference voltage, a frequency source operative to generate a first frequency and a frequency signal divider coupled to divide the frequency source to generate a second frequency signal, a J-K flip flop having J-K inputs responsive to the comparator and a clock input responsive to an output of the frequency divider at the second frequency signal, a gate coupling the frequency source to the drive circuit to couple signals at the first frequency to drive the inverter circuit, the gate being enabled and disabled in response to an output of the J-K flip flop.

6. A switching type power supply as defined in claim 5 and further including:

a voltage stabilization capacitor connected in the output means so as to shunt the load.

7. A switching type power supply comprising:

an inverter circuit including input means for accepting a DC signal and an operative for switching the DC signal;

oscillating feedback means for operating the inverter circuit at a predetermined and controlled frequency, output means including a rectifier, filter, a tuned LC power transmission circuit having a low impedance at the predetermined and controlled frequency, and operative for coupling an output of the inverter to a load, a comparator coupled to compare an output voltage with a reference voltage, and means responsive to the comparator for detuning the LC power transmission circuit when the output voltage is over a limit and, hence, significantly reduce power flow to the output.

8. A switching type power supply, comprising:

an input and an output, a power switching inverter for interconnecting energy from the input to the output, means for comparing a voltage at the output to a reference voltage and generating a control signal state representative of relative magnitude of the voltage at the output and the reference voltage, means for operating the power switching inverter at a predetermined and controlled frequency, the output including a tuned energy path having low impedance at the predetermined and controlled frequency, and means responsive to the control signal state for significantly reducing power flow to the output for at least a predetermined fixed time delay when a voltage at the output is over a limit, the means for significantly reducing power flow including means for detuning the tuned energy path in order to significantly reduce power flow to the output.

9. A switching type power supply, comprising:

an input and an output, a power switching inverter for interconnecting energy from the input to the output, means for comparing a voltage at the output to a reference voltage and generating a control signal state representative of relative magnitude of the voltage at the output and the reference voltage, means for driving the power switching inverter at a first predetermined and controlled frequency, and means for enabling the means for driving at a second predetermined and controlled frequency lower in frequency than the first predetermined and controlled frequency and in response to the control signal state whereby the power switching inverter operates at a first frequency when the voltage at the output is below a first desired level and the power switching inverter is nonoperative when the voltage at the output is above a second desired level, the means for enabling comprising a bistable logic circuit clocked in response to the second predetermined and controlled frequency and gating means for transmitting a signal at the first predetermined and controlled frequency to the means for driving in response to bistable logic circuit.

10. A switching type power supply as defined in claim 9 wherein:

the output includes a voltage stabilizing capacitor.

* * * * *